United States Patent [19]
Bucalo et al.

[11] Patent Number: 5,786,752
[45] Date of Patent: Jul. 28, 1998

[54] EMERGENCY SIGNAL SYSTEM FOR VEHICLES

[76] Inventors: Louis R. Bucalo, 3418 Divisadero St., San Francisco, Calif. 94123; Brian D. Bucalo, 1010 S. Ocean Blvd., #LPH9 Pompano, Fla. 33062

[21] Appl. No.: 678,957

[22] Filed: Jul. 12, 1996

[51] Int. Cl.$^6$ ........................................ B60Q 1/50
[52] U.S. Cl. ................... 340/467; 340/466; 340/468; 340/469; 340/479; 340/463; 340/464
[58] Field of Search ........................... 340/466, 467, 340/468, 469, 471, 472, 479, 463, 464, 441

[56] References Cited

U.S. PATENT DOCUMENTS

| | | | |
|---|---|---|---|
| 3,324,454 | 6/1967 | Haratani | 340/466 |
| 4,550,305 | 10/1985 | Bookbinder | 340/467 |
| 4,800,377 | 1/1989 | Slade | 340/466 |
| 4,894,641 | 1/1990 | Yang | 340/466 |
| 4,959,634 | 9/1990 | Miller | 340/467 |
| 5,148,147 | 9/1992 | Kobres | 340/464 |
| 5,301,130 | 4/1994 | Alcone et al. | 364/565 |
| 5,404,130 | 4/1995 | Lee et al. | 340/479 |
| 5,594,415 | 1/1997 | Ishikawa et al. | 340/467 |
| 5,610,578 | 3/1997 | Gilmore | 340/479 |

Primary Examiner—Thomas J. Mullen, Jr.
Assistant Examiner—Ashok Mannava
Attorney, Agent, or Firm—Steinberg & Raskin, P.C.

[57] ABSTRACT

A vehicle signaling method and device for alerting drivers approaching from a rear of the vehicle including at least one light emitting signal arranged on an element of the vehicle facing rearward, a velocity measurement sensor for measuring an absolute velocity of the vehicle and a control unit coupled to the velocity measurement sensor for determining if the measured absolute velocity is greater than a threshold velocity. In one embodiment, there is a manual light activation unit which is connected to the control unit and the light emitting signal(s). The manual light activation unit is controlled by the control unit to enable the light emitting signal(s) to be activated only if the measured absolute velocity is less than the threshold velocity. In another embodiment, which can be used separate from or together with the velocity control unit, the device includes a deceleration measurement sensor coupled to the velocity threshold measurement sensor for measuring deceleration of the vehicle and which are activated by the control unit only if the measured absolute velocity is greater than a threshold velocity. A deceleration threshold determining unit then determines if the measured deceleration is greater than a threshold deceleration and the light emitting signal(s) is activated if the absolute velocity is greater than the threshold velocity as determined by the control unit and the measured deceleration is greater than the deceleration threshold as measured by the deceleration threshold determining unit.

24 Claims, 6 Drawing Sheets

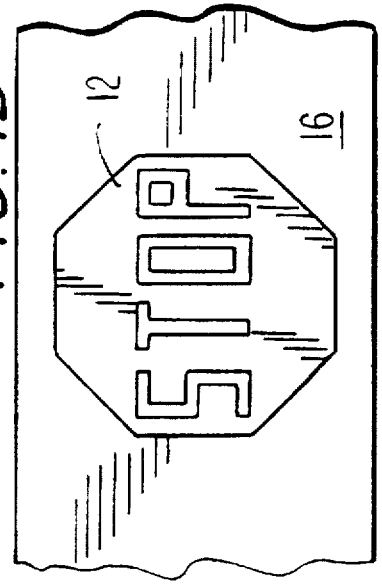
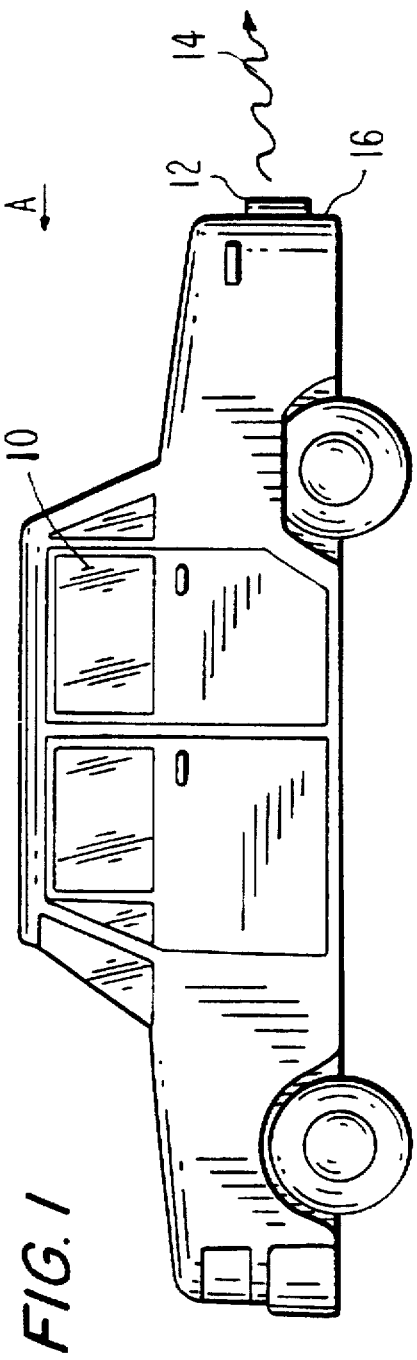
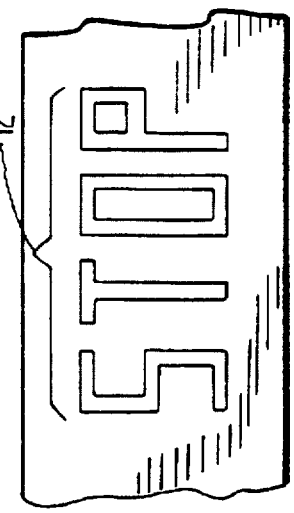

EMERGENCY SIGNAL SYSTEM FOR VEHICLES

FIELD OF THE INVENTION

The present invention relates generally to a system for vehicular emergency stopping signals, and in particular to a system for emergency stopping signals which are present in the rear of an automobile and which is intended to prevent rear-end collisions by signaling drivers approaching from the rear that the automobile in front of them is stopped or decelerating rapidly.

BACKGROUND OF THE INVENTION

At the present time, a serious problem exists with current vehicular braking or stop signals. In particular, current signal methods are non-specific and non-attention getting for the purpose of signaling drivers approaching from the rear of the vehicle that an abnormal and potentially unsafe situation is occurring. The current methods are also quite limited and consist of either constant or intermittent activation of brake lights by applying or pumping the brake pedal, respectively, or manual activation of usually red hazard flashers which flash synchronously in a repetitive on-off fashion. The non-specificity or non-uniqueness of these currently available signals often causes delay in response in true emergency or hazardous circumstances, and confusion. For example, applying the brakes and activating the brake lights does not convey an unequivocal message to drivers approaching from the rear that the vehicle ahead of them is decelerating in an abnormally rapid fashion or stopped in moving traffic. Hazard flashers also do not convey a uniquely defined or sufficiently attention-grabbing signal message to drivers approaching from the rear. Such hazard lights are utilized in extremely varied circumstances, and in addition do not stand out strongly from, nor contrast markedly with, normal brake lights or illuminated tail lights.

Furthermore, it is another problem that the aforementioned currently available signals are non-attention getting due to the pervasiveness of these visual signals and their frequency of occurrence in the driving environment. Unfortunately, drivers have become desensitized to their presence and often do not react to such signals until it is too late to avoid an accident. Also, when decelerating rapidly, drivers usually will simply depress the brake pedal, once and hard. This action will result in the brake lights being illuminated continuously and does not alert a driver approaching from behind that the driver ahead is coming to a rapid stop. It is a common occurrence, for example, in highway driving, that an individual driving a vehicle will be unaware that the vehicle or vehicles ahead have come to a rapid slowing or sudden stop, because such an event is unexpected in flowing highway traffic, and brake light activation as seen by the individual is interpreted as routine for several seconds, until the rapidly closing distance is perceived. Often, it is then too late to prevent a collision. In addition, cars that are completely stopped in moving traffic lanes are an extreme hazard, because drivers do not become sufficiently alerted to this abnormal and dangerous situation by standard car flasher signals. Many deaths have occurred when cars have collided with vehicles that are stopped in highway lanes or other high-speed roads, despite activation of currently available flasher signals.

Attempts have been made to make drivers more aware that the car ahead is braking, but nothing has been addressed to the specific problem of prominently and unequivocally signaling a very rapid deceleration or a car abnormally stopped in a traffic lane, to the cars approaching from behind. For example, a third brake light is now standard on all American cars. However, this feature is not helpful in specifically alerting approaching drivers of a rapid deceleration or dead stop of the car ahead because the third brake light provides a signal which is not unique or rapidly attention getting. The third brake light merely illuminates in synchronicity with the other brake lights. Visibility may be increased slightly, but the specificity of the rearward directed visual signal for unsafe and abnormal circumstances has not been enhanced by the third brake light.

OBJECTS AND SUMMARY OF THE INVENTION

It is therefore an object of the present invention to avoid the above drawbacks of the current signal systems.

It is another object of the present invention to provide methods and devices for creating a novel and prominent signal for vehicles such as automobiles which will help prevent rear end collisions by rapidly and decisively alerting drivers approaching from the rear that the vehicle ahead is in either rapidly decelerating or stopped in a traffic lane.

It is yet another object of the present invention to provide a new and improved emergency signal method and system for automobiles.

To achieve these objects, and others, in one embodiment, optical signals comprising a non-standard vehicle light color or colors and/or pattern are emitted rearward from an automobile. The light colors and/or pattern is/are different from that currently used on ordinary cars, emergency vehicles and police vehicles. This optical signal would not be the same as those that are standard on most cars and hence would carry a unique message to approaching drivers. The optical signal light could be a unique, non-standard/ unconventional color such as bright yellow, purple or green. This optical signal light could be in the form of a continuous beam having a higher illumination intensity than conventional, e.g., for brake lights, or a series of attention-getting strobe pulses. Novel color combinations in various rapid patterns could also be employed.

In another embodiment of the invention, the optical signal could be a non-standard flashing sequence or combination of the currently available lights on the automobile which face rearward. For example, the two or three red brake lights in currently available automobiles normally all illuminate simultaneously and at a constant intensity when the brake pedal is depressed. Similarly, the white back-up lights illuminate together when the car is moving in reverse and the normally red hazard lights flash together simultaneously when the flasher switch is activated. The simultaneous illumination of the two or three red brake lights, the isolated illumination of the white back-up lights during reverse movement of the vehicle, the simultaneous flashing of the red hazard lights as well as the unilateral flashing of red or orange turn signals facing rearward can all be considered standard visual signals from the rear of the vehicle in conventional U.S. automobiles. By contrast, in this particular embodiment of the invention, the red brake lights could illuminate in a continuous sequential fashion, i.e., left, then right, then center, then left, then right etc. Alternatively, the red, white and orange lights could simultaneously illuminate, or sequentially illuminate in a rapid scanning fashion, i.e., left red, then left orange, then left white, then right white, then right orange, then right red, then right orange, then right white, then left white, then left orange, then left red, etc. Alternatively, all of the red, orange and white rear lights could rapidly flash on and off in unison. These unique combinations or sequences of lights will serve to catch the attention of the driver approaching from the rear. Increased intensity of light in association with the non-standard sequence or combination could also be employed.

In another embodiment of the invention, the unique optical signal is built into or mounted upon the currently available third brake light which is mandatory equipment on all American cars. The unique optical signal could be in the form of one of the previously mentioned unique colors and/or sequences, and/or intensity, and/or be a rapid strobe which is attention getting at a distance.

All of the aforementioned unique optical signals would operate under the control of a sensing and control system which would activate or prevent activation of the optical signal(s).

Thus, in one embodiment, the vehicle signaling device for alerting drivers approaching from a rear of the vehicle in accordance with the invention comprises at least one light emitting signal arranged on an element of the vehicle facing rearward and having an inactivated state in which light is not emitted and an activated state in which light is emitted, means for enabling manual activation of the light emitting signal(s), velocity measurement means for measuring an absolute velocity of the vehicle, and control means coupled to the velocity measurement means and to the manual activation enabling means. The control means determine if the measured absolute velocity greater than a threshold velocity and if so, enable activation of the light emitting signal(s) from the inactivated state to the activated state by the manual activation enabling means. The manual activation enabling means may comprise a manually operated switch accessible to an operable by an occupant of the passenger compartment of the vehicle.

The velocity measurement means may include means for preventing a wide variation in output therefrom, i.e., incorporate hysteresis. With respect to the light emitting signal(s), the light emitting signal(s) may be a vehicle light signal having a non-standard color, e.g., bright yellow, purple or green, a pulsating strobe light and/or a light operatively connected to a third centrally arranged brake light on the vehicle. For several lights arranged on a rear section of the vehicle, the device can include light control activation means coupled to the control means for sequentially activating at least two of the lights or simultaneously activating the lights, e.g., if they are arranged on a rear section of the vehicle in a nonstandard configuration. As an even further attention-getter, the light emitting signal may comprise the word "Stop" or its equivalent in a language other than English or be in the form of an octagonal "Stop" sign. The velocity measurement means can be selected from the group consisting of a vehicle speedometer and an integrating accelerometer or an apparatus which measures wind velocity relative to the vehicle or measure angular velocity of at least one wheel of the vehicle. The light emitting signal may have a variable intensity, in which case, the device includes light control activation means for changing the intensity of the light emitting signal.

In one particular embodiment of the invention, the vehicle includes two brake lights each on a respective side of the vehicle and a third brake light centrally arranged between the two side brake lights. The two side brake lights and the centrally arranged brake light have standard illumination intensities. However, the light emitting element(s) in the invention has a non-standard illumination intensity different than the standard illumination intensities of the two side brake lights and the centrally arranged brake light. This provides a distinct contrast to alert the drivers approaching from the rear of the vehicle of the rapid deceleration or stopping of the vehicle.

In another specific embodiment, each of a plurality of light emitting elements is arranged on a rear part of the vehicle and provides an illumination in a standard color. Light element control activation means are coupled to the manual activation enabling means and the light emitting elements for activating the light emitting elements in a non-standard pattern.

In another embodiment of the invention, the vehicle signaling device comprises at least one light emitting signal arranged on an element of the vehicle facing rearward, velocity measurement means for measuring an absolute velocity of the vehicle and deceleration measurement means for measuring deceleration of the vehicle. In this embodiment, the light emitting signal(s) is activated from its inactivated state to its activated state by control means only if the absolute velocity is greater than a threshold velocity set by or provided to the control means and the measured deceleration is greater than a deceleration threshold set by or provided to the control means, which may or may not occur simultaneously. The control means may include velocity threshold determining means coupled to the velocity measurement means for determining if the measured absolute velocity is greater than the threshold velocity and deceleration threshold determining means for determining if the measured deceleration is greater than the threshold deceleration. In addition, the velocity measurement means and deceleration measurement means may include means for preventing a wide variation in output therefrom, i.e., incorporate hysteresis. The deceleration measurement means can be operatively connected to a brake pedal of the vehicle and selected from the group consisting of an accelerometer, a strain gauge, a pressure sensor and an accelerometer. Alternatively, the deceleration measurement means can be a velocity sensor for measuring the velocity with which the brake pedal of the vehicle is depressed.

In another embodiment of the invention, the device comprises at least one light emitting signal arranged on an element of the vehicle facing rearward, means for enabling manual activation of the light emitting signal(s), velocity measurement means for measuring an absolute velocity of the vehicle and deceleration measurement means for measuring deceleration of the vehicle. Control means are coupled to the velocity measurement means and to the manual activation enabling means for enabling activation of the light emitting signal(s) from its inactivated state to its activated state by the manual activation enabling means if the measured absolute velocity is less than (or possibly substantially equal to) a threshold velocity set in the control means. The control means are also coupled to the deceleration measurement means and arranged to activate the light emitting signal(s) from its inactivated state to its activated state if the absolute velocity is greater than the threshold velocity set in the control means and the measured deceleration is greater than (or possibly substantially equal) to a deceleration threshold set in the control means. To this end, the control means may comprise deceleration threshold determining means coupled to the deceleration measurement means for determining if the measured deceleration is greater than the threshold deceleration. As such, in this embodiment, the light emitting element(s) is activated in one of two ways; either through the manual activation enabling means if the measured absolute velocity is less than the threshold velocity or if the absolute velocity is greater than the threshold velocity as determined by the velocity threshold determining means and the measured deceleration is greater than the deceleration threshold as measured by the deceleration threshold determining means.

BRIEF DESCRIPTION OF THE DRAWINGS

The following drawings are illustrative of embodiments of the invention and are not meant to limit the scope of the invention as encompassed by the claims.

FIG. 1 is a side view of a vehicle having a rear-mounted colored light in accordance with the invention.

FIG. 1A is a view taken in the direction of arrow A of FIG. 1 in an embodiment in which the light signal is the word "Stop".

FIG. 1B is a view taken in the direction of arrow A of FIG. 1 in an embodiment in which the light signal is an octagonal sign including the word "Stop".

DETAILED DESCRIPTION OF THE INVENTION

Figure 2:
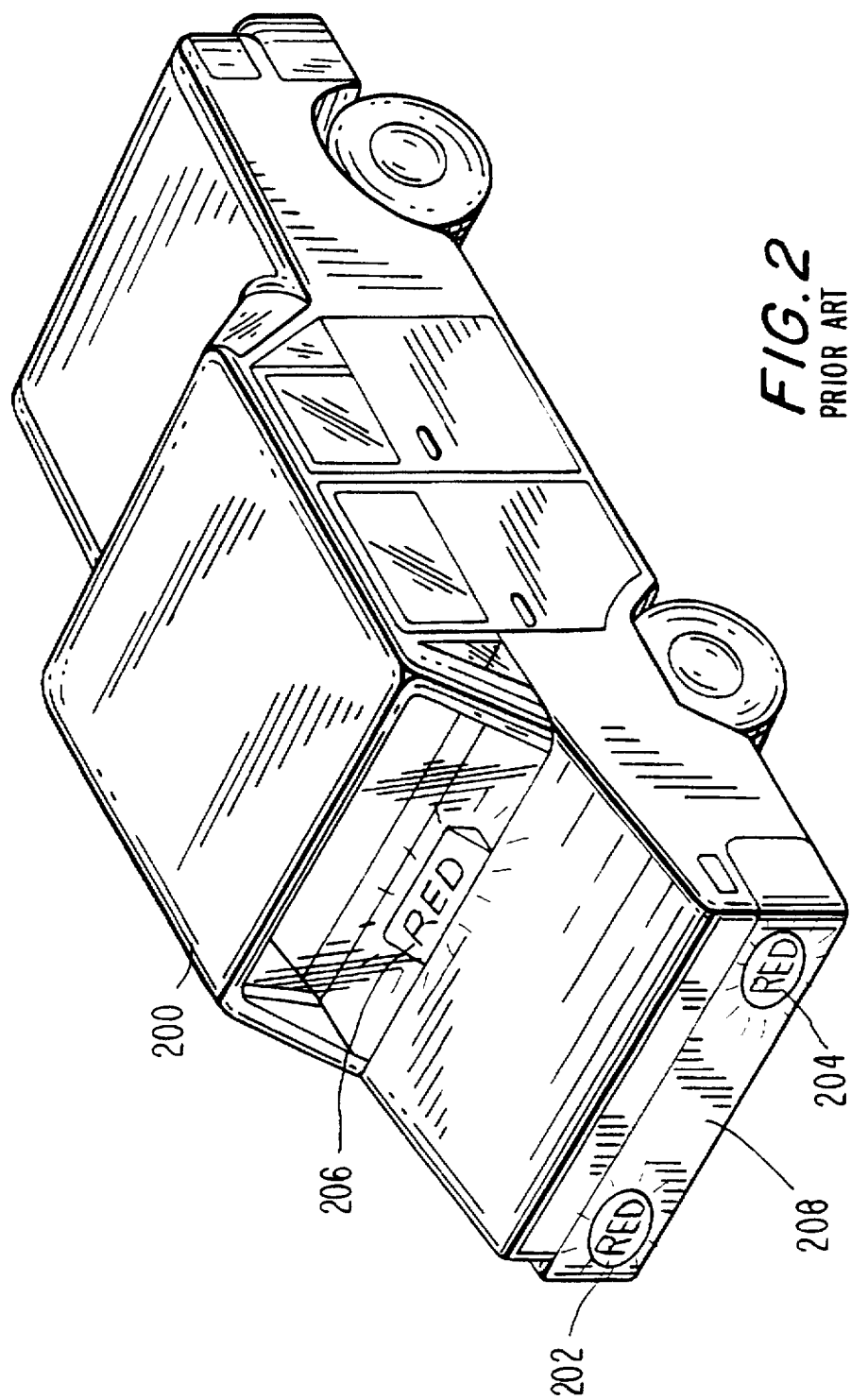
FIG. 2 is a rear perspective view of a vehicle having a standard three brake light system in which all three lights are simultaneously illuminated.

Referring to the accompanying drawings wherein the same reference numerals refer to the same or similar elements, in the embodiment of FIG. 1, a light emitting signal member 12 is positioned on a rear element 16 of the vehicle 10, e.g., on the trunk or rear panel. The light emitting member 12 emits light waves 14 having a color or colors which is different from that currently used on ordinary cars, emergency vehicles and police vehicles, e.g., bright yellow, purple and green. The light emitting member 12 could be designed and actuated to provide an optical signal light in the form of a continuous beam of light waves or a series of attention-getting strobe pulses or an illumination having a non-standard intensity with respect to conventional brake lights having standard illumination intensities. A plurality of such light emitting members 12 could be placed on the rear 16 of the vehicle 10 connected to the same actuating means, each having a different color so that novel color combinations can be obtained. The light emitting member(s) are connected to an actuation system such as described below with reference to FIG. 6. FIGS. 1A and 1B show possible configurations of the light emitting member.

FIG. 2 shows a prior art braking system on a vehicle. The system includes three brake lights 202,204,206, two lights 202,204 on a rear panel 208 of the vehicle 200 and a third 206 in a central location above the trunk, and often within the vehicle interior compartment. As is conventional in the art, all three of these lights 202,204,206 illuminate at a standard illumination simultaneously upon depressing the brake pedal, regardless of the intensity of the force exerted on the brake pedal.

Figure 3:
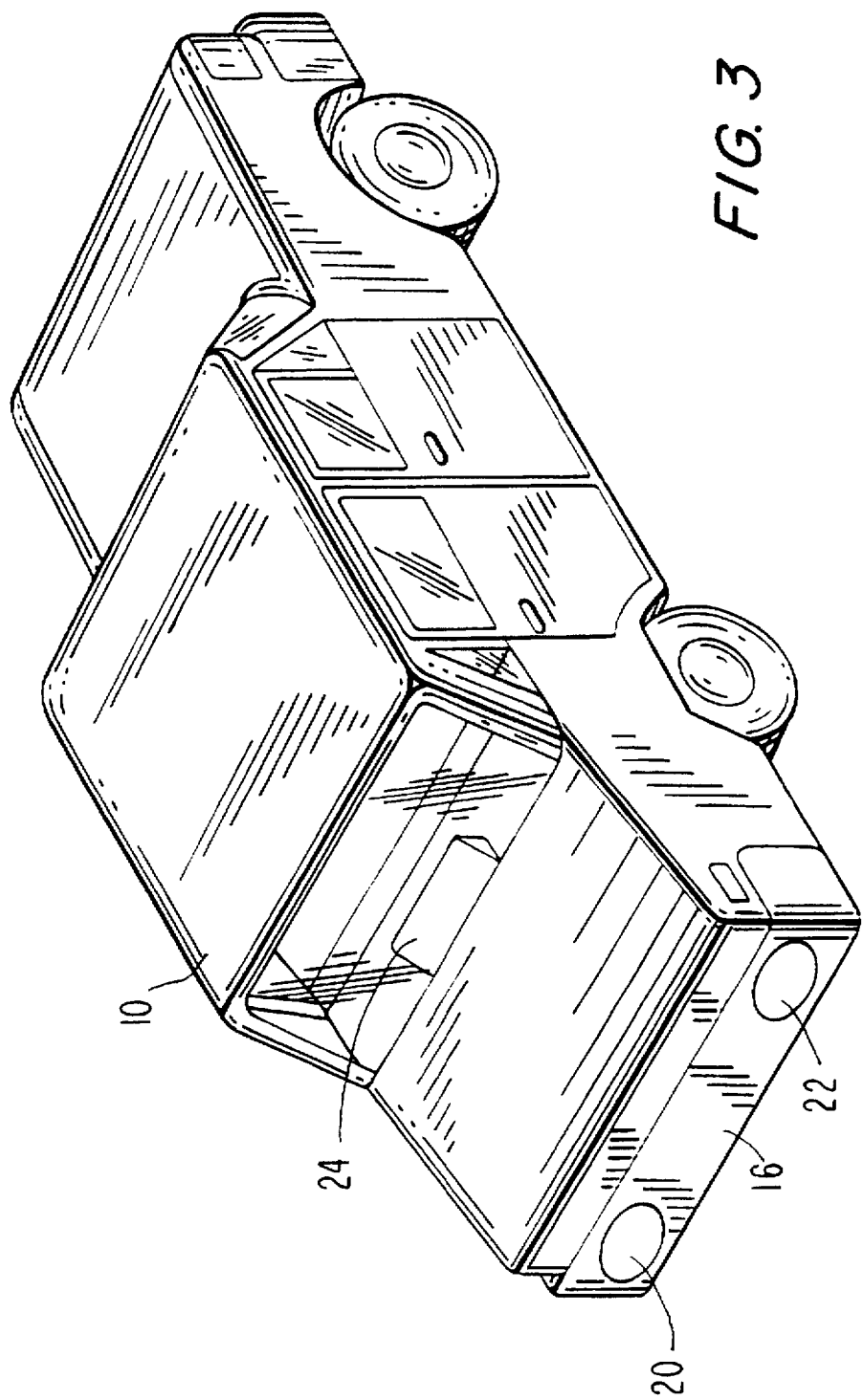
FIG. 3 is a rear perspective view of a vehicle having a standard three brake light system in which all three lights are sequentially illuminated.

FIG. 3 shows an embodiment of the present invention in which the actuation means (FIG. 3) of the three brake lights 20,22,24 in an existing three-light braking system are configured to sequentially illuminate the brake lights 20,22,24, as opposed to simultaneously as in the prior art. Thus, upon depressing the brake pedal, the brake lights 20,22,24 on the vehicle 10 illuminate, e.g., as follows, first the left brake light 20 mounted on the rear element 16 of the vehicle 10, then the right brake light 22, then the center brake light 24, and so on. Other sequential series of illuminations of brake lights 20,22,24 and obviously envisioned and within the scope of this invention.

Figure 4:
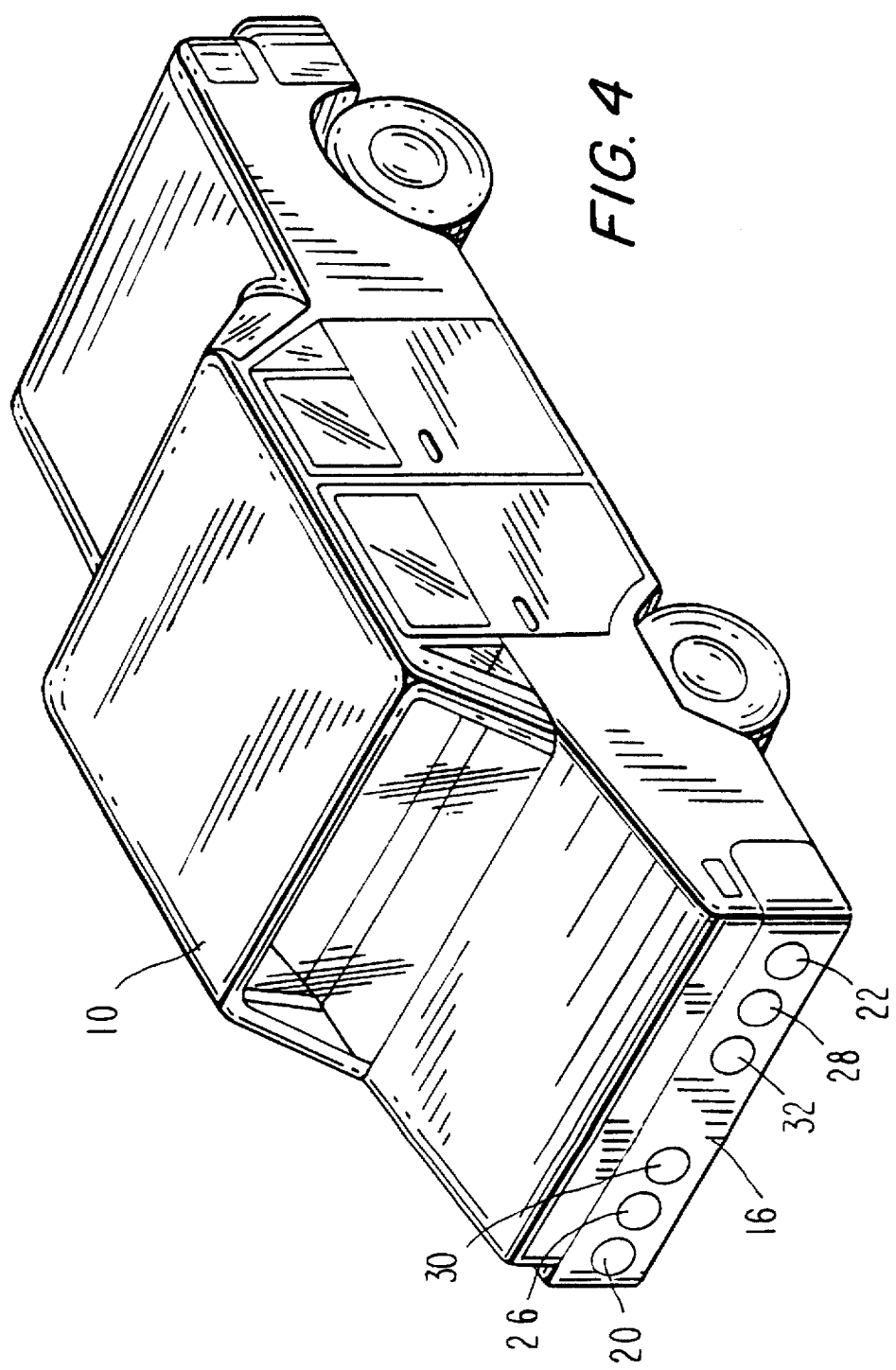
FIG. 4 is a rear perspective view of a vehicle having three different colored lights on each side which are sequentially illuminated
Figure 6:
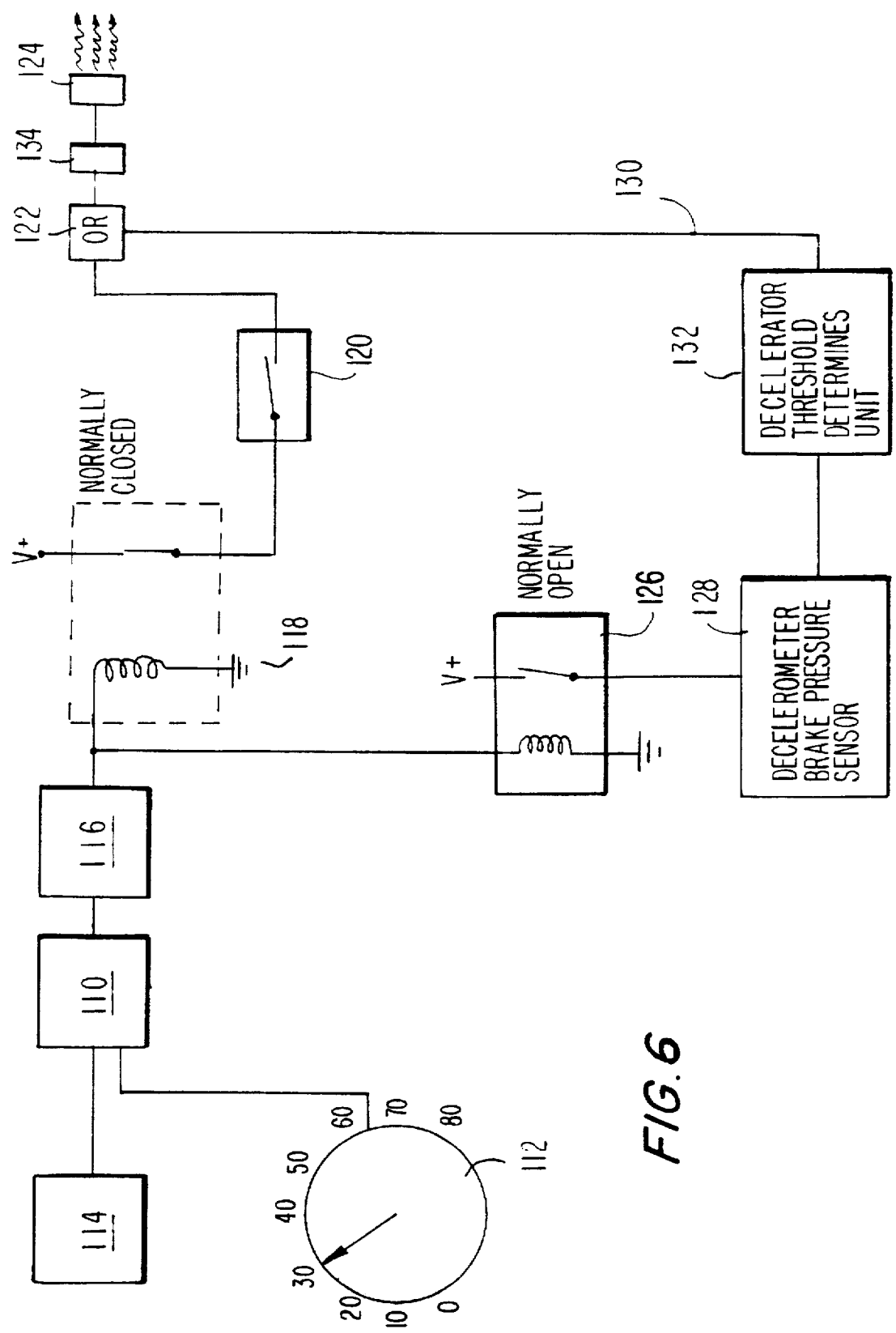
FIG. 6 is a schematic diagram of a sensing and control system for the light systems in accordance with the invention.

In another embodiment shown in FIG. 4, an actuating system could be designed to operate on all the lights on the rear element 16 of the vehicle 10, namely the two standard red brake lights 20,22, the standard white back-up lights 30,32 which operate when the vehicle is moving in reverse, and orange lights 26,28 situated between the red lights 20,22 and a proximate one of the white lights 30,32. In this embodiment, the lights 20,22,26,28,30,32 are electrically coupled to actuating means (e.g., as shown in FIG. 6) which control the illumination of the lights so that the lights are illuminated in a set sequence, e.g., left red light 20, then left orange light 26, then left white light 30, then right white light 32, then right orange light 28, then right red light 22, then right orange light 28, then right white light 32, then left white light 30, then left orange light 26, then left red light 20, etc. Alternatively, all of the lights could flash on and off in unison or the sequence can be varied depending on the situation. These unique combinations or sequences of lights will serve to catch the attention of the driver approaching from the rear.

Figure 5:
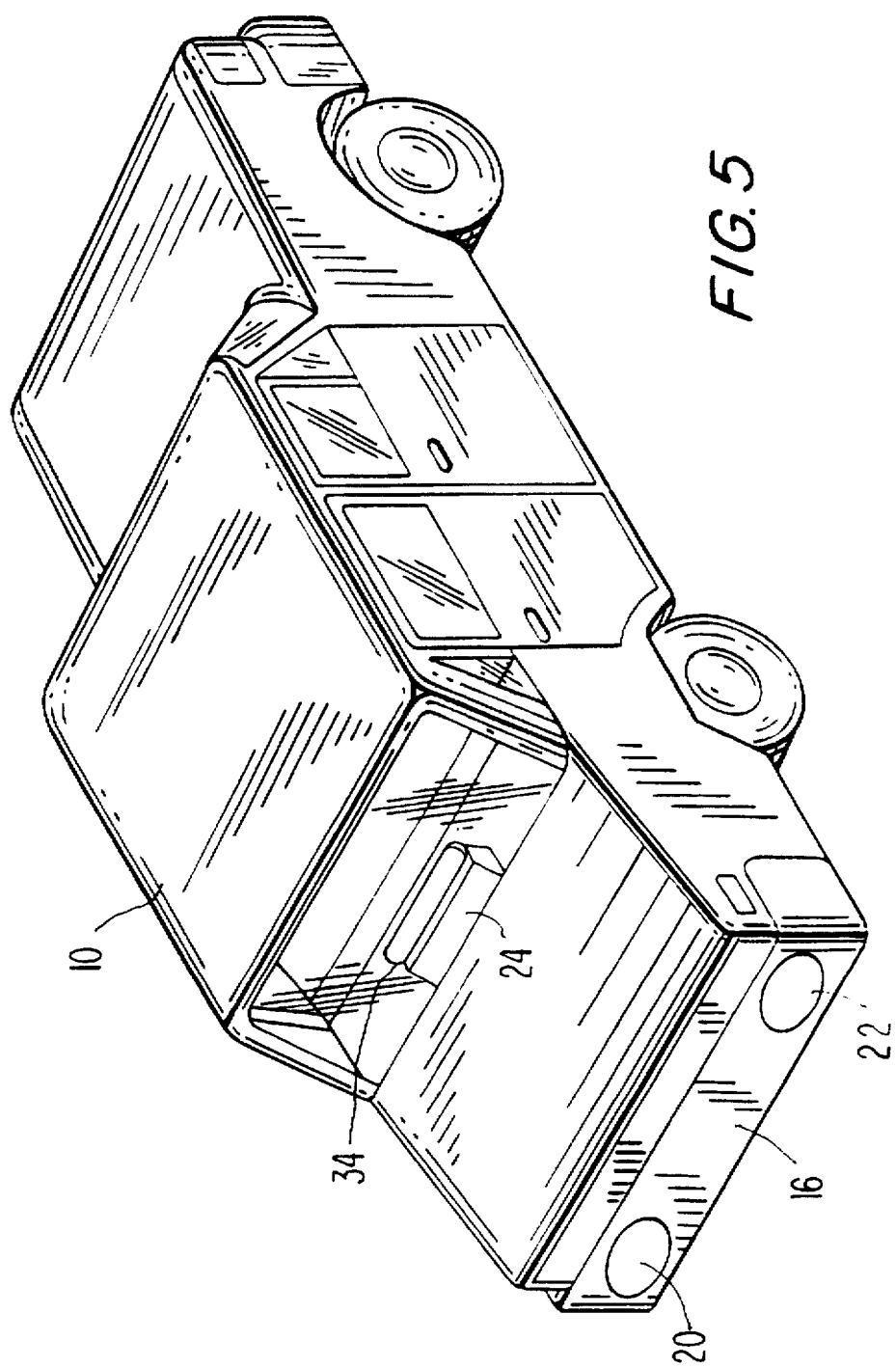
FIG. 5 is a rear perspective view of a vehicle having a strobe light situated above the third brake light.

In another embodiment of the invention shown in FIG. 5, an additional light 34 is built into or mounted upon, or in conjunction with, the currently available third brake light 24 which is mandatory equipment on all American cars. A unique optical signal provided by light 34 could be in the form of one of the previously mentioned unique colors and/or sequences with respect to the other lights, and/or intensity, and/or be a rapid strobe which is attention-getting at a distance. This embodiment including four rear-facing lights can be considered a non-standard pattern of lights, the three-light triangular pattern now required on American automobiles being a standard pattern. One of the more notable alternative embodiments of FIG. 5 is the construction of the additional light 34 to have an illumination intensity which is non-standard, i.e., different that the standard illumination intensity of the three brake lights on the vehicle. In this manner, the additional light 34 can be brighter or duller than the brake lights thereby providing a distinct contrast which could be interpreted by the drivers approaching from the rear of the vehicle of a sudden change in movement of the vehicle.

For all of the disclosed embodiments of the light system in accordance with the invention, a sensing and control system is coupled to all of the active and connected lights. The sensing and control system or actuation means activates or prevents activation of the lights. One embodiment of a sensing and control system is illustrated in FIG. 6 and comprises velocity measurement means such as a velocity sensor 110 connected to a speedometer 112 in the automobile, or alternatively to an integrating accelerometer 114, and thereby senses and records the automobile's absolute velocity. When the absolute velocity of the automobile is sensed to be below a set threshold as determined by suitable determining/comparison means such as threshold detector 116 into which the set threshold is entered, a relay 118, which is coupled to the threshold detector 116 and normally closed, is de-energized thereby enabling manual switch 120 to activate an optical signal generating means such as a light 124 through an "or" gate 122. Other means for enabling manual activation of the light 124 on condition that the measured velocity is greater than the threshold velocity as determined by the threshold detector 116 can be used within deviating from the scope of the invention. The threshold detector 116, the relay 118, switch 120 and "or" gate 122 constitute parts of a control unit or control means for the light 124. If the velocity of the automobile is above the threshold velocity then relay 118 is energized and the relay contacts become opened thereby preventing switch 120 from activating the optical signal generating means 124 through the "or" gate 122, i.e., activation of switch 120 will not cause the light 124 to illuminate from its inactivated condition. In this manner, the unique optical signal is prevented from being manually activated while the car is traveling at normal highway speeds. Such a feature would prevent activation of the unique optical signal inadvertently or by intentional abuse of the warning system. If the car were to be stopped in traffic or traveling below the threshold speed, then relay 118 would be de-energized thereby enabling switch 120. The threshold speed should be selected to be an abnormal and unsafe low speed for highway, freeway and state and federal road driving. Upon enabling of switch 120, the light 124 could then be activated manually by the driver of the vehicle to alert drivers approaching from the rear that the car is stopped or stopping in a traffic lane. It is understood of course that in the same manner that optical signal generating means such as light 124 is activated, a plurality of such optical signal generating means could be activated simultaneously or sequentially, e.g., on an arrangement of light facing rearward as described with reference to FIGS. 1–5, to thereby achieve the objects of the invention. For example, the "or" gate could lead to several optical signal generating means 124 or to a light signal control activation unit 134 arranged to provide for intermittent lighting of a plurality of such optical signal generating means 124 coupled thereto, e.g., in a sequential lighting arrangement or a simultaneously lighting arrangement.

FIG. 6 also shows a second sensing and control system in accordance with the invention which can be used together with or independent of the sensing and control system described above. In this second sensing and control system, a relay 126, which is normally open, is controlled by the output of the threshold detector 116. If the vehicle is traveling above the threshold velocity, then relay 126 is also energized. This permits activation of sensor 128, i.e., the relay 126 constitutes a sensor activation mechanism. Sensor 128 may be of several types of detectors which measure deceleration of the car. For example, sensor 128 may be a decelerometer to measure the automobile's deceleration. Once the deceleration exceeds a certain threshold value as detected by a deceleration threshold determining unit 132 coupled to the deceleration measurement sensor 128, a signal is sent through wire 130 to the "or" gate 122 thereby activating the optical warning signal 124. As such, activation of the optical warning signal 124 is based on the measured velocity of the vehicle being greater than a velocity threshold and the deceleration of the vehicle being greater than a deceleration threshold. Also, in the embodiment where in both sensing and control systems are operating, there are two ways in which the optical warning signal 124 can be activated, either manually when the measured velocity is less than the threshold velocity or automatically when the measured velocity is greater than the threshold velocity and the deceleration of the vehicle is greater than a deceleration threshold.

Deceleration measurement sensor 128 may be a strain gauge, pressure sensor, or velocity sensor operatively connected to the brake pedal thereby sensing the force and/or velocity with which the brake pedal is depressed. Strong pressure applied for a minimum, defined time interval on the brake pedal would correlate with a rapid deceleration and subsequently result in a signal being transmitted through wire 130 to actuate the "or" gate 122 and subsequently the optical signal generating means 124. If the vehicle is traveling below the threshold velocity, relay 126 is de-energized thereby preventing activation of sensor 128 based on the deceleration of the vehicle. This prevents inadvertent activation of the optical signal generating means 124 at low speeds below the threshold speed or when stopped, such as when one applies pressure to the brake while stopped at a red light, based on a rapid deceleration or braking action.

The examples provided above are not meant to be exclusive. Many other variations of the present invention would be obvious to those skilled in the art, and are contemplated to be within the scope of the appended claims. For example, methods for alerting drivers approaching from a rear of the vehicle to changes in the velocity or rate of change in the velocity, e.g., deceleration, are contemplated. One such method comprises the steps of arranging on the rear of the vehicle at least one light emitting element having an inactivated state and an activated state in which light is emitted, such activated state creating a visual signal that is a non-standard color and/or intensify and/or sequential pattern and/or grouping of illuminated vehicle rear lights, and controlling the activation of the one light emitting element (s) in relation to the absolute velocity of the vehicle. Another method comprises the steps of arranging on the rear of the vehicle at least one light emitting element having an inactivated state and an activated state in which light is emitted, such activated state creating a visual signal that is a non-standard color and/or intensity and/or sequential pattern and/or grouping of illuminated vehicle rear lights, and controlling the activation of the light emitting element(s) in relation to the rate of change of velocity of the vehicle (and possibly also in relation to the change in the absolute velocity).

We claim:

1. A vehicle signaling device for alerting drivers approaching from a rear of the vehicle, the vehicle including a brake pedal, comprising at least one light emitting signal arranged on the vehicle facing rearward and having an activated state in which light is emitted and an inactivated state in which light is not emitted, velocity measurement means for measuring an absolute velocity of the vehicle, deceleration measurement means for measuring deceleration of the vehicle, said deceleration measurement means being operatively associated with the brake pedal of the vehicle such that deceleration of the vehicle is measured by said deceleration measurement means after the brake pedal is depressed, and control means coupled to said velocity measurement means and said deceleration measurement means for activating said at least one light emitting signal from its inactivated state to its activated state only if the absolute velocity is greater than a threshold velocity in said control means and the measured deceleration is greater than a deceleration threshold in said control means.

2. The device of claim 1, wherein said control means comprise velocity threshold determining means coupled to said velocity measurement means for determining if the measured absolute velocity is greater than the threshold velocity, and deceleration threshold determining means coupled to said deceleration measurement means for determining if the measured deceleration is greater than the threshold deceleration.

3. The device of claim 1, wherein said at least one light emitting signal comprises two or more light emitting signals having currently standard light colors utilized on vehicle rear lights and arranged to be simultaneously illuminated thereby creating a non-standard visual signal from the rear of the vehicle.

4. The device of claim 1, wherein said at least one light emitting signal comprises two or more light emitting signals currently utilized as vehicle rear lights and arranged to be sequentially illuminated thereby creating a non-standard visual signal from the rear of the vehicle.

5. The device of claim 1, wherein said at least one light emitting signal comprises a non-standard, higher intensity of one or more standard light colors currently utilized on vehicle rear lights, thereby creating a non-standard visual signal from the rear of the vehicle.

6. The device of claim 1, wherein said deceleration measurement means comprises a velocity sensor coupled to the brake pedal for measuring the velocity with which the brake pedal is depressed.

7. The device of claim 1, wherein said at least one light emitting signal is a vehicle light emitting signal having a non-standard color.

8. The device of claim 1, wherein said at least one emitting signal comprises a plurality of light emitting signals arranged on a rear section of the vehicle in a non-standard configuration, further comprising light signal control activation means coupled to said control means and to said plurality of light emitting signals for simultaneously activating at least two of said plurality of light emitting signals.

9. The device of claim 1, wherein said at least one emitting signal has a variable intensity, further comprising light signal control activation means coupled to said control means and said at least one light emitting signal for changing the intensity of said at least one light emitting signal.

10. The device of claim 1, wherein said deceleration measurement means comprise a deceleration measurement sensor connected to the brake pedal.

11. The device of claim 1, wherein said deceleration measurement means comprise a sensor coupled to the brake pedal for sensing the force applied to the brake pedal.

12. A vehicle signaling device for alerting drivers approaching from a rear of the vehicle, comprising
at least one light emitting signal arranged on the vehicle facing rearward and having an activated state in which light is emitted and an inactivated state in which light is not emitted,
means for enabling manual activation of said at least one light emitting signal from said inactivated state to said activated state,
velocity measurement means for measuring an absolute velocity of the vehicle,
deceleration measurement means for measuring deceleration of the vehicle, and
control means coupled to said velocity measurement means and said manual activation enabling means for enabling activation of said at least one light emitting signal from said inactivated state to said activated state by said manual activation enabling means if the measured absolute velocity is less than a threshold velocity in said control means, said control means being coupled to said deceleration measurement means and arranged to activate said at least one light emitting signal from its inactivated state to its activated state if the absolute velocity is greater than the threshold velocity in said control means and the measured deceleration is greater than a deceleration threshold in said control means.

13. The device of claim 12, wherein said at least one light emitting signal is a vehicle light emitting signal having a non-standard color.

14. The device of claim 12, wherein said at least one light emitting signal comprises two or more light emitting signals having currently standard light colors utilized on vehicle rear lights and arranged to be simultaneously illuminated thereby creating a non-standard visual signal from the rear of the vehicle.

15. The device of claim 12, wherein said at least one light emitting signal comprises two or more light emitting signals currently utilized as vehicle rear lights and arranged to be sequentially illuminated thereby creating a non-standard visual signal from the rear of the vehicle.

16. The device of claim 12, wherein said at least one light emitting signal comprises a non-standard, higher intensity of one or more standard light colors currently utilized on vehicle rear lights, thereby creating a non-standard visual signal from the rear of the vehicle.

17. The device of claim 12, wherein said at least one emitting signal comprises a plurality of light emitting signals arranged on a rear section of the vehicle in a non-standard configuration, further comprising light signal control activation means coupled to said deceleration threshold determining means, said control means and said plurality of light emitting signals for simultaneously activating at least two of said plurality of light emitting signals.

18. The device of claim 12, wherein said at least one emitting signal has a variable intensity, further comprising light signal control activation means coupled to said deceleration threshold determining means, said control means and said at least one light emitting signal for changing the intensity of said at least one light emitting signal upon activation of said at least one light emitting signal.

19. A method for alerting drivers approaching from a rear of the vehicle to changes in the velocity of the vehicle, comprising the steps of:
arranging on the rear of the vehicle at least one light emitting signal having an inactivated state and an activated state in which light is emitted, and
controlling the activation of said at least one light emitting signal in relation to the rate of change of velocity of the vehicle, said activation controlling step comprising the steps of:
measuring an absolute velocity of the vehicle,
measuring deceleration of the vehicle after a brake pedal of the vehicle is depressed, and
activating said at least one light emitting signal from its inactivated state to its activated state only if the absolute velocity is greater than a threshold velocity and the measured deceleration is greater than a deceleration threshold.

20. The method of claim 19, wherein said at least one light emitting signal is arranged such that it creates a visual signal in a non-standard color.

21. The method of claim 19, wherein said at least one light emitting signal is arranged such that it creates a visual signal in a variable intensity.

22. A method for alerting drivers approaching from a rear of the vehicle to changes in the velocity of the vehicle, comprising the steps of:

arranging on the rear of the vehicle at least one light emitting signal having an inactivated state and an activated state in which light is emitted, and controlling the activation of said at least one light emitting signal in relation to the absolute velocity of the vehicle and the deceleration of the vehicle, said activation control step comprising the steps of:

measuring an absolute velocity of the vehicle, measuring deceleration of the vehicle, enabling manual activation of said at least one light emitting signal from said inactivated state to said activated state if the measured absolute velocity is less than a threshold velocity, and automatically activating said at least one light emitting signal from its inactivated state to its activated state if the absolute velocity is greater than the threshold velocity and the measured deceleration is greater than a deceleration threshold.

23. The method of claim 22, wherein said at least one light emitting signal is arranged such that it creates a visual signal in a non-standard color.

24. The method of claim 22, wherein said at least one light emitting signal is arranged such that it creates a visual signal in a variable intensity.

* * * * *